United States Patent [19]
Bradshaw

[11] Patent Number: 5,348,478
[45] Date of Patent: Sep. 20, 1994

[54] MODULAR TERRAIN BOARD

[76] Inventor: Micheal Bradshaw, 5990 Richmond Hwy., Apt. #606, Alexandria, Va. 22303

[21] Appl. No.: 955,423

[22] Filed: Oct. 2, 1992

[51] Int. Cl.⁵ ............ G09B 29/00; G09B 29/12; G09B 19/00
[52] U.S. Cl. ............ 434/150; 434/152; 434/96
[58] Field of Search ........ 446/118, 117, 110; 434/150, 151, 152, 96

[56] References Cited

U.S. PATENT DOCUMENTS

| | | | |
|---|---|---|---|
| 1,449,519 | 3/1923 | Layton | 446/110 X |
| 3,420,527 | 1/1969 | Morin | 434/96 X |
| 3,464,145 | 9/1969 | Martin | 434/96 X |
| 4,398,890 | 8/1983 | Knowlton | 434/96 |

FOREIGN PATENT DOCUMENTS

| | | | |
|---|---|---|---|
| 99518 | 2/1984 | European Pat. Off. | 446/118 |
| 2252499 | 5/1974 | Fed. Rep. of Germany | 446/118 |
| 1001406 | 2/1952 | France | 446/118 |
| 1092032 | 1/1954 | France | 434/96 |
| 108069 | 7/1917 | United Kingdom | 446/118 |
| 2098495 | 11/1982 | United Kingdom | 446/117 |

*Primary Examiner*—Gene Mancene
*Assistant Examiner*—Cindy A. Cherichetti
*Attorney, Agent, or Firm*—Alfred F. Hoyte, Jr.

[57] ABSTRACT

A modular terrain board is provided having a plurality of sections or terrain cell plugs which are held in place by a baseboard assembly having a corresponding plurality of cell receiving sections or cells formed therein. The terrain cell plugs can be easily removed to allow for quick and accurate reconfiguration of the terrain model. The terrain board has means for representing buildings, rivers, lakes, roads, and other topographical features.

12 Claims, 13 Drawing Sheets

Exercise _____

Board _____

|   | 1 | 2 | 3 | 4 | 5 | 6 | 7 | 8 | 9 | 10 |
|---|---|---|---|---|---|---|---|---|---|----|
| A |   |   |   |   |   |   |   |   |   |    |
| B |   |   |   |   |   |   |   |   |   |    |
| C |   |   |   |   |   |   |   |   |   |    |
| D |   |   |   |   |   |   |   |   |   |    |
| E |   |   |   |   |   |   |   |   |   |    |
| F |   |   |   |   |   |   |   |   |   |    |
| G |   |   |   |   |   |   |   |   |   |    |
| H |   |   |   |   |   |   |   |   |   |    |
| I |   |   |   |   |   |   |   |   |   |    |
| J |   |   |   |   |   |   |   |   |   |    |

MODULAR TERRAIN BOARD

BACKGROUND OF THE INVENTION

The present invention relates to a modular terrain board used for training or educational purposes.

Simulated landscapes have been used for visual aids for training and educational purposes for many years. Until fairly recently, most simulated landscapes have been "permanent", i.e., incapable of being readily altered to simulate a new landscape or to make minor changes in the simulated landscape.

Although reconfigurable simulated landscapes have been made in the past they tended to have serious drawbacks. U.S. Pat. No. 4,193,211 (Dotsko) discloses a modular terrain board. The board features a multiplicity of panels joined together to form a simulated terrain or landscape. The panels are made of fiberglass or plaster and are held together by an adhesive. Panels are removed by pulling a packing string embedded in the adhesive thereby breaking the adhesive and allowing the panels to be replaced. U.S. Pat. No. 4,056,892 (Atencio) discloses an engineering table which can be used to simulate landscapes for surveying or other educational purposes. The table uses a wetted particulate substance, e.g. wet sand or oiled sawdust, to form the terrain. Buildings and other terrain features are simply placed on the simulated terrain at the appropriate location.

The problem with the Dotsko terrain board is that it uses an adhesive to join the panels. This adhesive takes a certain amount of time to dry thus making it difficult to change from one terrain scenario to another rapidly. Also, if several panels are to be removed, application of the adhesive itself is tedious and time consuming. Finally, if one wishes to change the orientation of structures the entire panel, or group of panels, must be replaced. An exact means for determining orientation of large structures or models is not provided. The Atencio apparatus is deficient because of the difficulty in simulating straight roads and other urban landscape features. Indeed, Atencio makes no mention of how to form roads or streets. Also once the terrain model is disassembled, reassembly of a given terrain scenario would be very difficult because although there is a grid underlying the structures to assist in placement, the grid is covered by the particulate medium once the terrain scenario is completed. Although there are scale means provided along the edges of the table, structures situated toward the middle of the the table will be difficult to place.

It is therefore an object of this invention to provide a reconfigurable simulated landscape for training and education purposes.

It is a further object of this invention to provide a simulated landscape which is quickly and easily reconfigured.

These and other objects of the present invention are accomplished by a terrain model board which has a plurality of sections or terrain cell plugs which are held in place by a baseboard assembly having a corresponding plurality of cell receiving sections or cells formed therein. The terrain cell plugs can be easily removed to allow for quick and accurate reconfiguration of the terrain model. The terrain board has means for representing buildings, rivers, lakes, roads, and other topographical features. Large buildings can be built in sections allowing for visual study of the building interior.

A variety of different environments can be simululated including urban, arctic, jungle, forest, and desert.

BRIEF DESCRIPTION OF THE DRAWINGS

FIG. 10 shows the recording chart used for recording the position of the various structures which can be mounted to the baseboard.

DETAILED DESCRIPTION OF THE INVENTION

Figure 1:
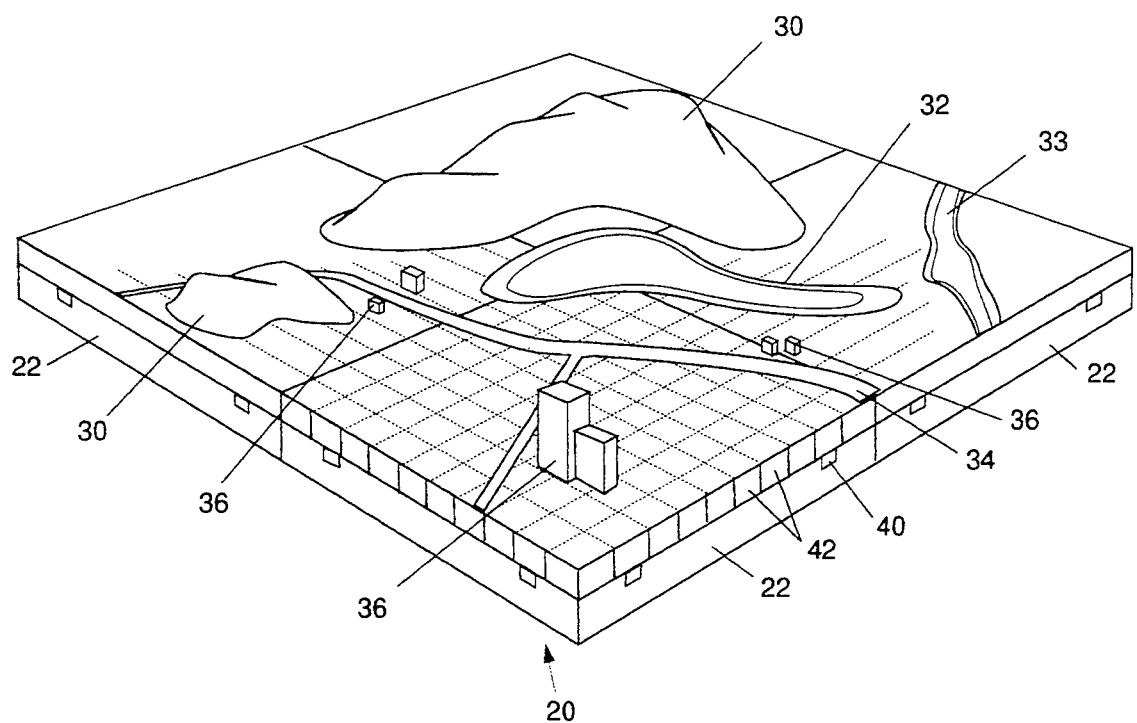
FIG. 1 is a perspective view of a complete terrain model.

Referring now to FIG. 1, there is shown a complete terrain model board 20. It can be readily appreciated that the terrain model board 20 is actually a plurality of baseboards 22 joined together by a plurality of baseboard connector clips 28. Each baseboard 22 has 100 baseboard cells 26. Any number of baseboards 22 can be joined to create a large scale terrain model board 20 of the desired size. All of the topograhical features of any landscape to be simulated can be represented using the terrain model board 20. Ridges or hills 30, rivers 33 and other bodies of water such as lakes and ponds 32, valleys or depressions, roads 34, and buildings 36, can be represented. The methods and materials used to represent these topographical features and structures will be discussed later.

Figure 2:
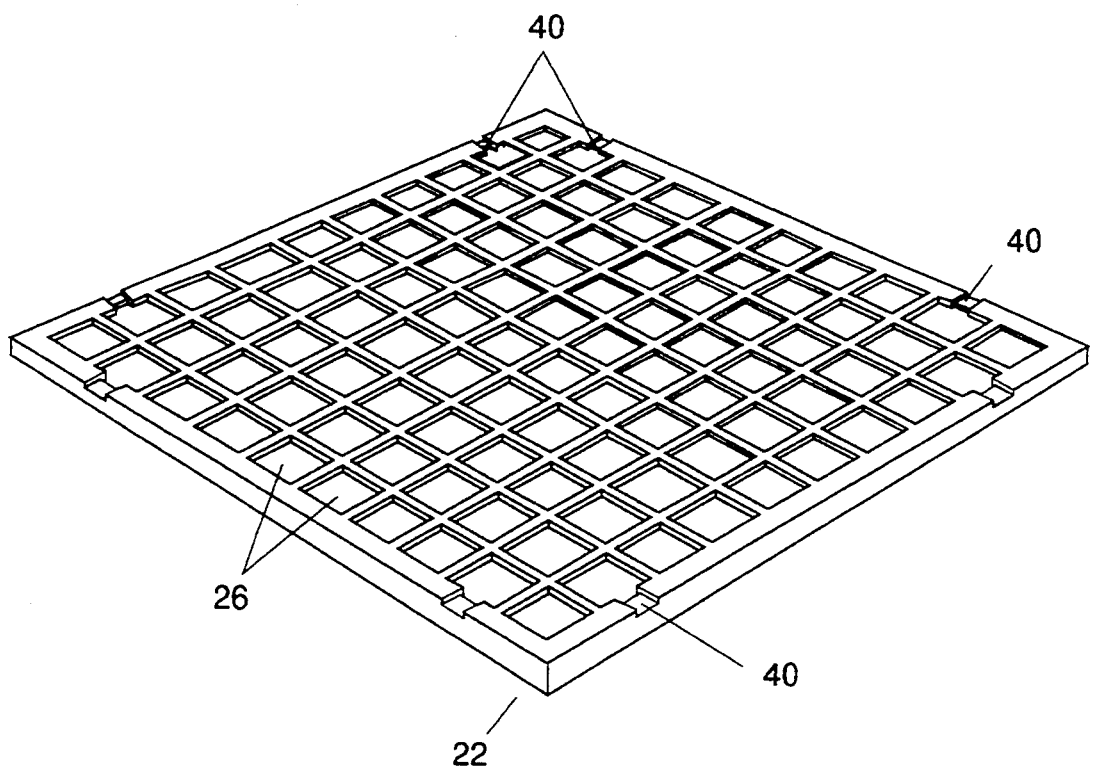
FIG. 2 is a perspective view of the baseboard.
Figure 3:
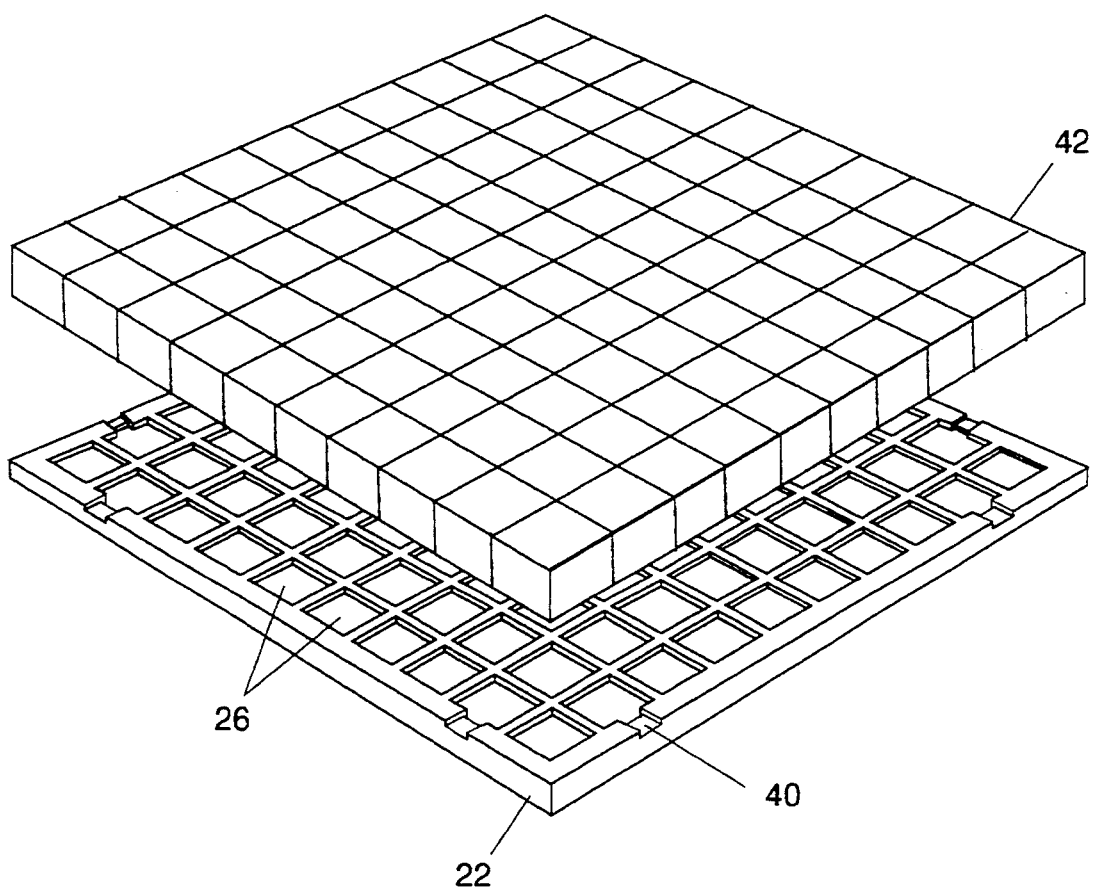
FIG. 3 is an exploded perpective view of the baseboard and the associated terrain cell plugs.

Referring now to FIG. 2, a perpective view of a baseboard 22 is shown. The baseboard 22 has 100 baseboard cells 26 formed therein. The two baseboard cells 26 immediately adjacent the four corner baseboard cells 26 have baseboard connector slots 40 formed along the outer edge to facilitate the connection of a plurality of baseboards 22 as will be explained later. FIG. 3 is an exploded perpective view of the baseboard 22 and the associated terrain cell plugs 42. It can be seen that the terrain cell plugs 42 provide for a smooth, continuous, surface. The color, texture, and relief of the terrain cell plugs 42 can be determined by the user.

Figure 4:
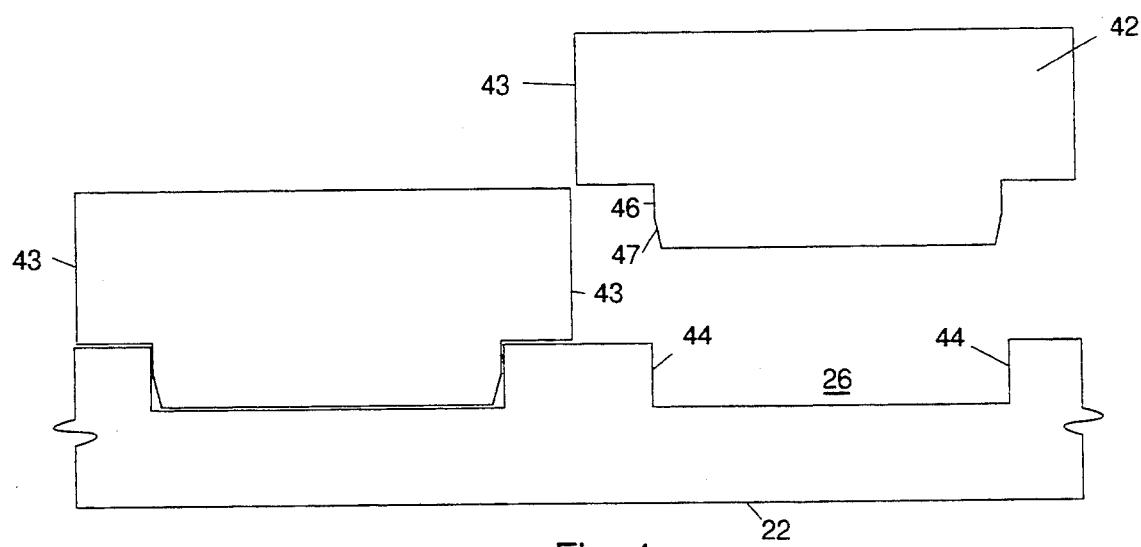
FIG. 4 is a partially exploded cross sectional view of two terrain cell plugs and their corresponding baseboard cells.
Figure 5:
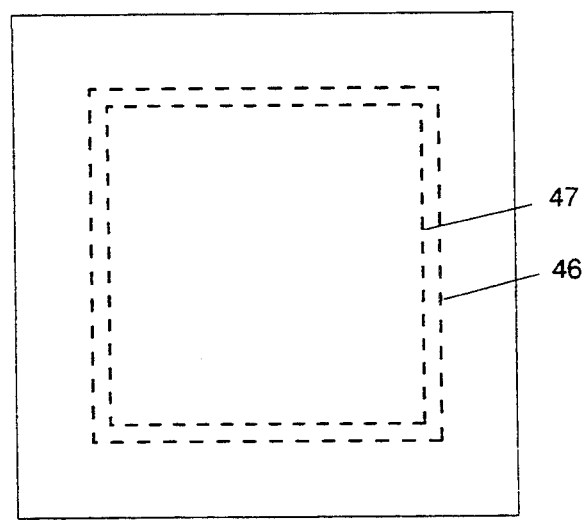
FIG. 5 is a top view of a terrain cell plug.

Referring now to FIG. 4, a partially exploded cross section of two baseboard cells 26 and their associated terrain cell plugs 42 is shown. Each baseboard cell 26 has four vertical baseboard cell walls 44. The terrain cell plugs 42 are adapted to seat firmly in the baseboard cell 26 by providing a projecting part 46 extending downwardly from the underside of the terrain cell plugs 42. The projecting part 46 is beveled at about a 20 degree angle to "guide" the terrain cell plugs 42 into the baseboard cells 26. It can be seen that the sides 43 of the terrain cell plugs 42 rest on top of the baseboard cell walls 44 and mount flush with each other when the terrain cell plugs 42 are positioned within the baseboard cells 26. It should be noted that the top portion of the terrain cell plugs 42 are of sufficient thickness to allow depressions to be formed therein. FIG. 5 shows a top view of a terrain cell plug 42 with the projecting part 46 and the beveling point 47 represented by broken lines.

Figure 6:
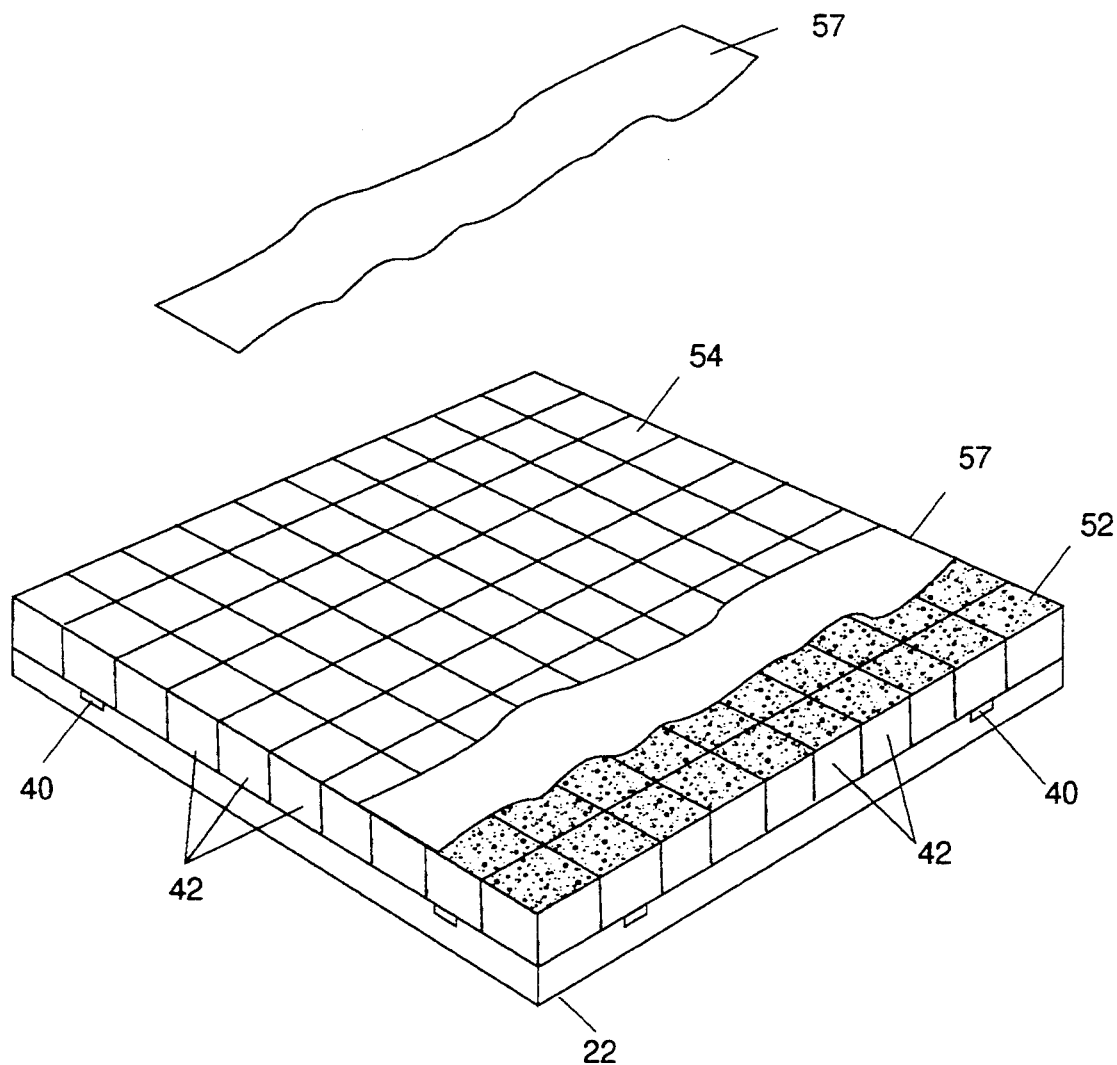
FIG. 6 shows a perpective view of a transition region mat which is placed between an water region and a flat land region.

FIG. 6 is a perspective view of a water region 52, a flat land region 54, and a transition region 57. The water region 52 is represented by blue colored terrain cell plugs 42 and the flat land region 54 is represented by green colored terrain cell plugs 42. The green terrain cell plugs 42 can be replaced by terrain cell plugs 42 of an alternative color and relief to simulate a specific shoreline region (e.g. grey and textured to simulate a rocky shoreline region). In the preferred embodiment the transition region 57 is a reusable static electric decal. The transition region 57 is of the appropriate color to simulate a shoreline region and is cut to the desired size and shape and placed over the terrain cell plugs 42 at the appropriate position. Alternatively, the transition region 57 is a strip of colored rubber which is cut to the desired size and shape and placed over the terrain cell plugs 42 at the appropriate position.

Figure 7A:
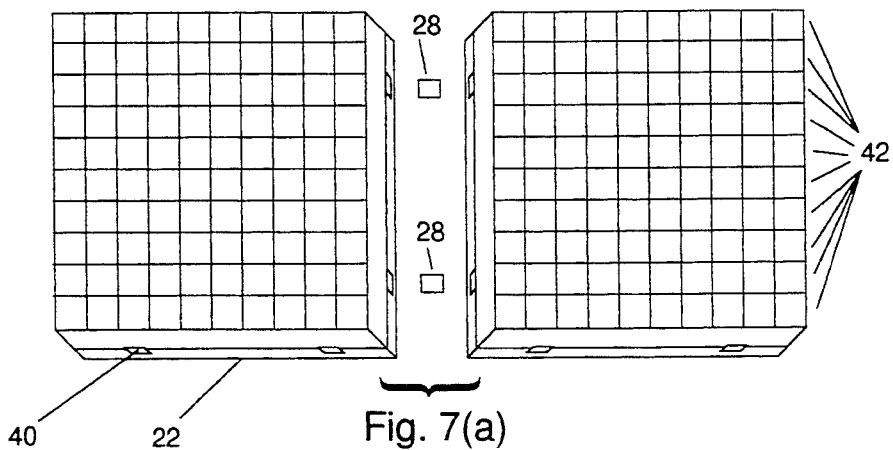
FIG. 7(a) shows a perspective view two baseboard assemblies which are to be conected.
Figure 7B:
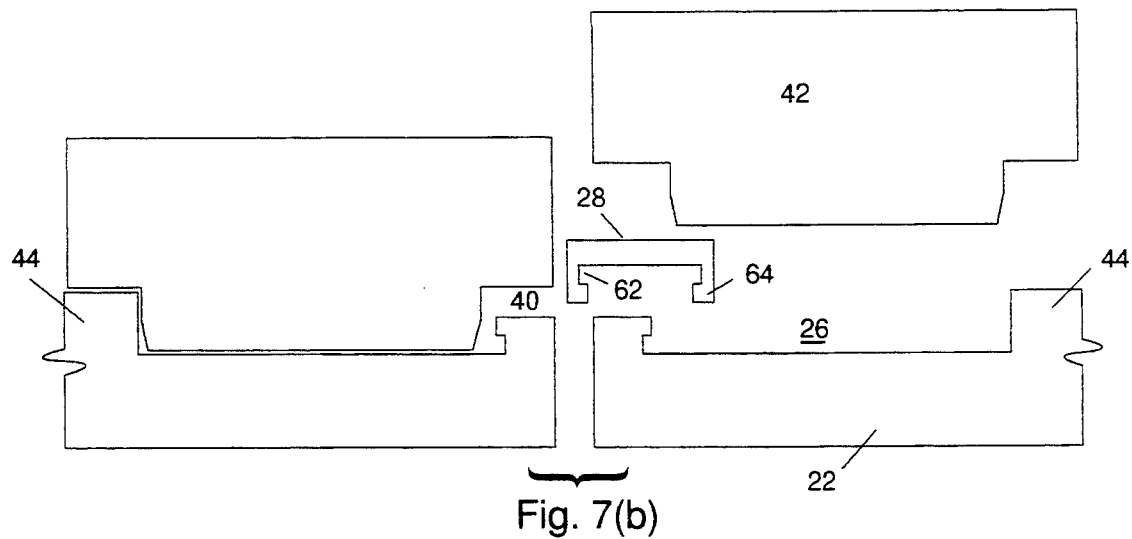
FIG. 7(b) shows a partially exploded enlarged view detailing the way the connector fits between the two baseboard assemblies.
Figure 7C:
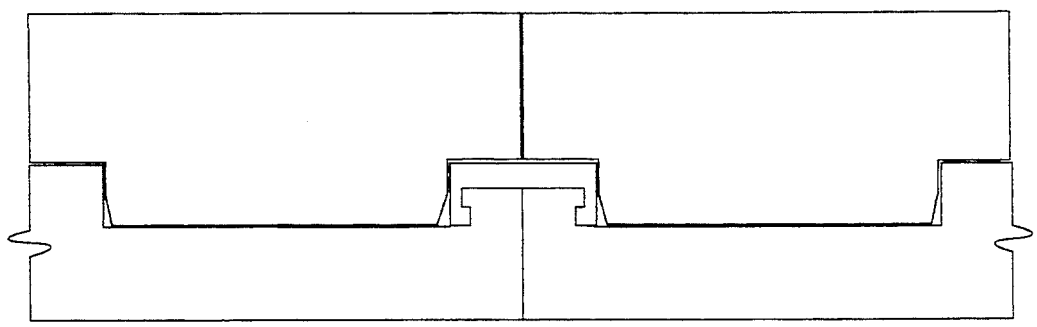
FIG. 7(c) shows an enlarged view of two baseboards which have been joined.

FIGS. 7(a)–7(c) are illustrative of the manner in which the baseboards 22 are joined. The baseboard connector clips 28 allow a plurality of baseboards 22 to be joined to create a simulated landscape of the desired dimensions and scale. FIG. 7(a) shows how two baseboards 22 which are to be joined are aligned prior to joining. After the baseboards 22 are pushed together so that their edges are flush, the appropriate terrain cell plugs 42 are removed so that the baseboard connector slots 40 can be accessed as is illustrated in FIG. 7(b). The baseboard connector clips 28 have a downwardly extending lip 62 which has a horizontally extending piece 64 which allows the clip 28 to fit a snugly into the slot 40. FIG. 7(c) is a cross sectional view of the connection point of two baseboards 22 with the baseboard connector clip 28 and the terrain cell plugs 42 in place.

Figure 8A:
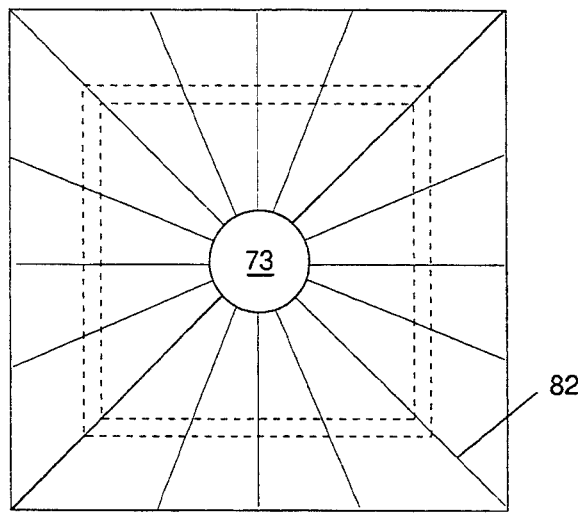
FIG. 8(a) shows top views of the registration cell plug and connector pin.
Figure 8C:
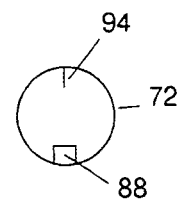
FIG. 8(c) shows a top view of a registration connector pin.
Figure 8D:
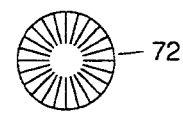
FIG. 8(d) shows a bottom view of a registration connector pin.
Figure 8B:
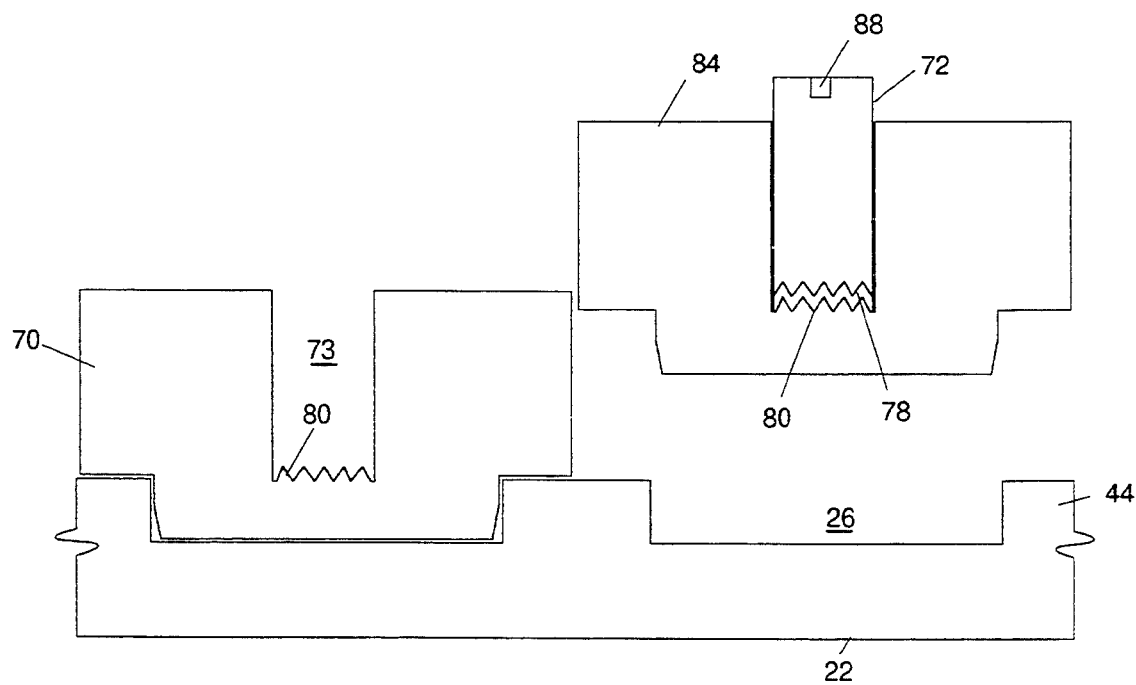
FIG. 8(b) shows a partially exploded cross sectional view of the registration cell plug and connector pin.

FIGS. 8(a) and 8(b) show the registration cell plug 70, and the registration connector pin 72 which are used to secure and orient structures on the baseboard 22. The registration cell plug 70 is essentially a special terrain cell plug 42 having a central bore 73 formed therein and adapted to receive a registration connector pin 72 which is shown in FIG. 8(c). The bottom surface of the registration connector pin 72 has a plurality of teeth 78 which mesh with a corresponding plurality of teeth 80 formed at the bottom of cylindrical bore 73 as shown in FIGS. 8(b) and 8(d). The teeth 78 and 80 serve to limit the orientation of the associated structure to 16 discrete positions as indicated by the orientation lines 82 which are molded on the top surface of the registration cell plugs 70. When the registration connector pin 72 is fully inserted into bore 73 a portion extends above the top surface 84 of the registration cell plug 70.

Figure 9:
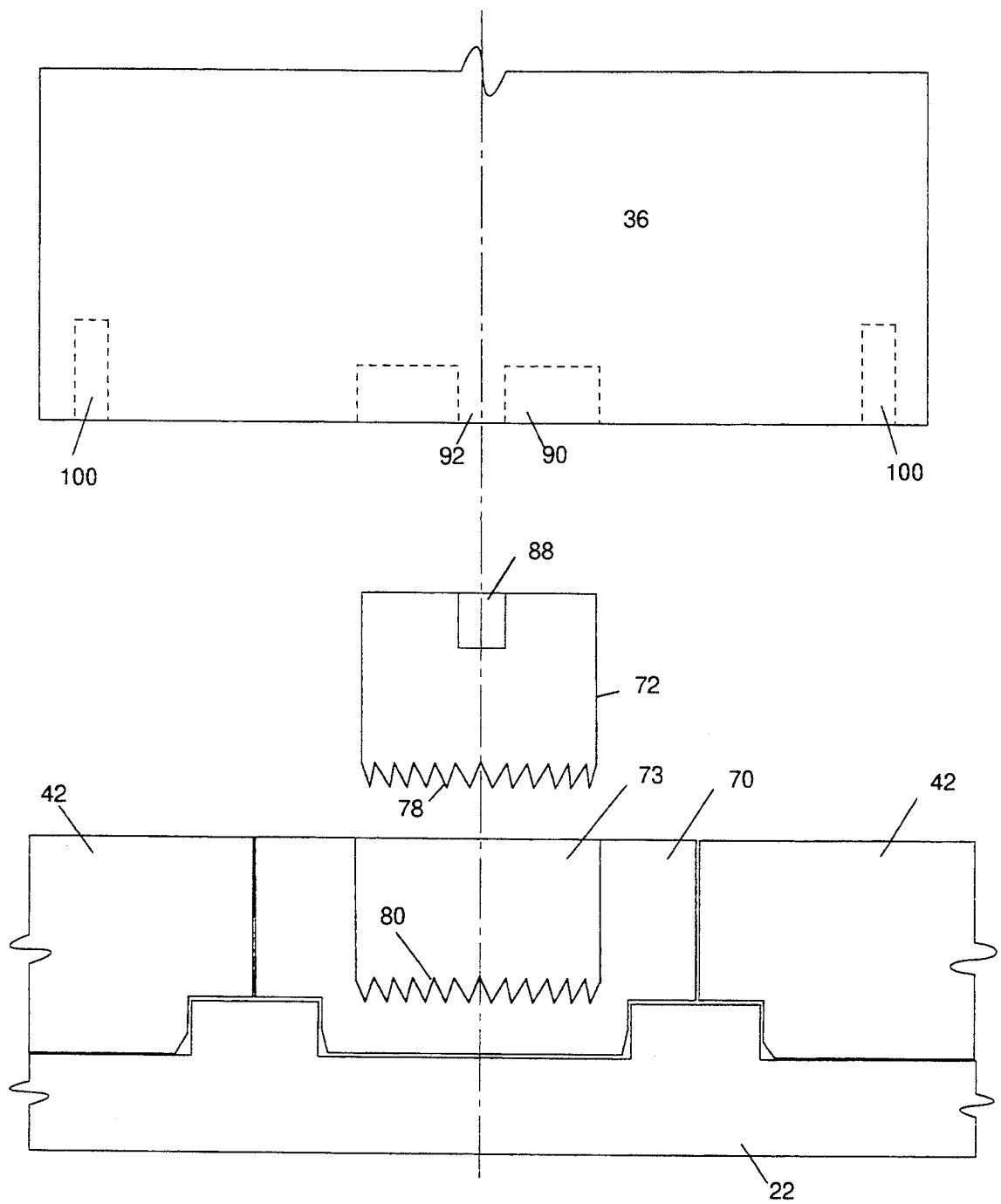
FIG. 9 is an exploded view of a registration cell plug, a registration connector pin, and a building or other structure.

Referring now to FIG. 9, an exploded view of a building 36 a registration connector pin 72, and a registration cell plug 70 is shown. The registration connector pin 72 has a notch 88 formed therein. The underside of a building 36 has a registration pin socket 90 adapted to provide frictional engagement with the registration connector pin 72. The building 36 is secured in position by the locking tab 92 which is adapted to fit into notch 88. In order to properly orient the building 36 or other structure the registration connector pin alignment line 94 (FIG. 8(c)) is aligned with the appropriate orientation line 82. The position of the registration connector pin alignment line 94 can be recorded on a chart for later reference if so desired. It should be noted at this point that a chart can be provided to record the position of all of the elements that make up the simulated terrain to facilitate reconstruction of the terrain.

Figure 11:
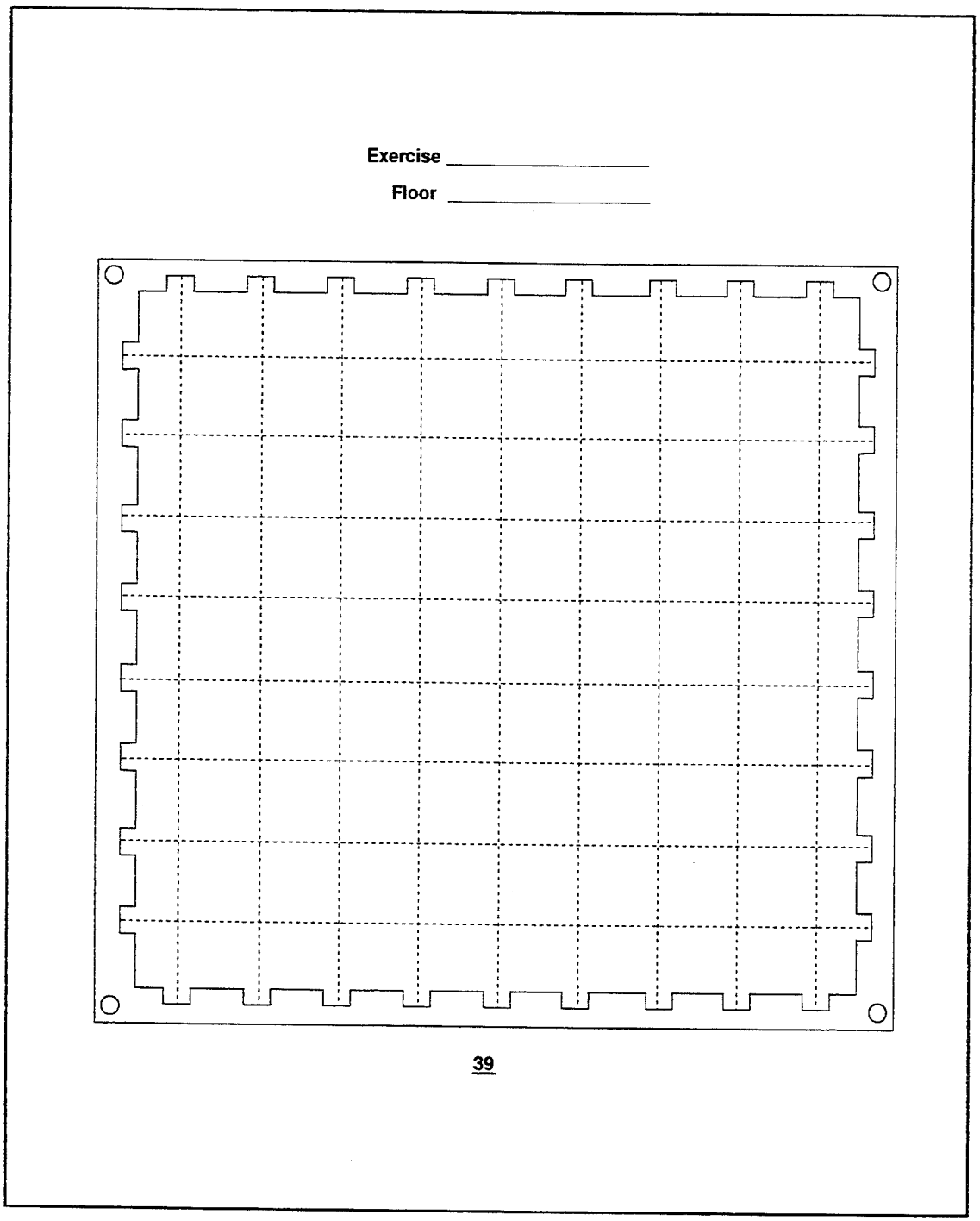
FIG. 11 shows the recording chart for recording the position of the structural features and objects in the buildings.

The chart 37 which is used to record the position of the elements is a two dimensional representation of the baseboard 22 as is shown in FIG. 10. Reusable decals representing each element are used to show the position and orientation of the elements. FIG. 11 shows the recording chart 39 for recording the position of structures such as walls and doors which are within the building 36.

Now various other structures and the method of mounting them on the baseboard 22 will be described.

The method of securing the buildings 36 to the baseboard 22 has already been described. Relatively small buildings 36 and other topograpical features can be simply placed at the desired location without using a registration cell plug 70.

Figure 12:
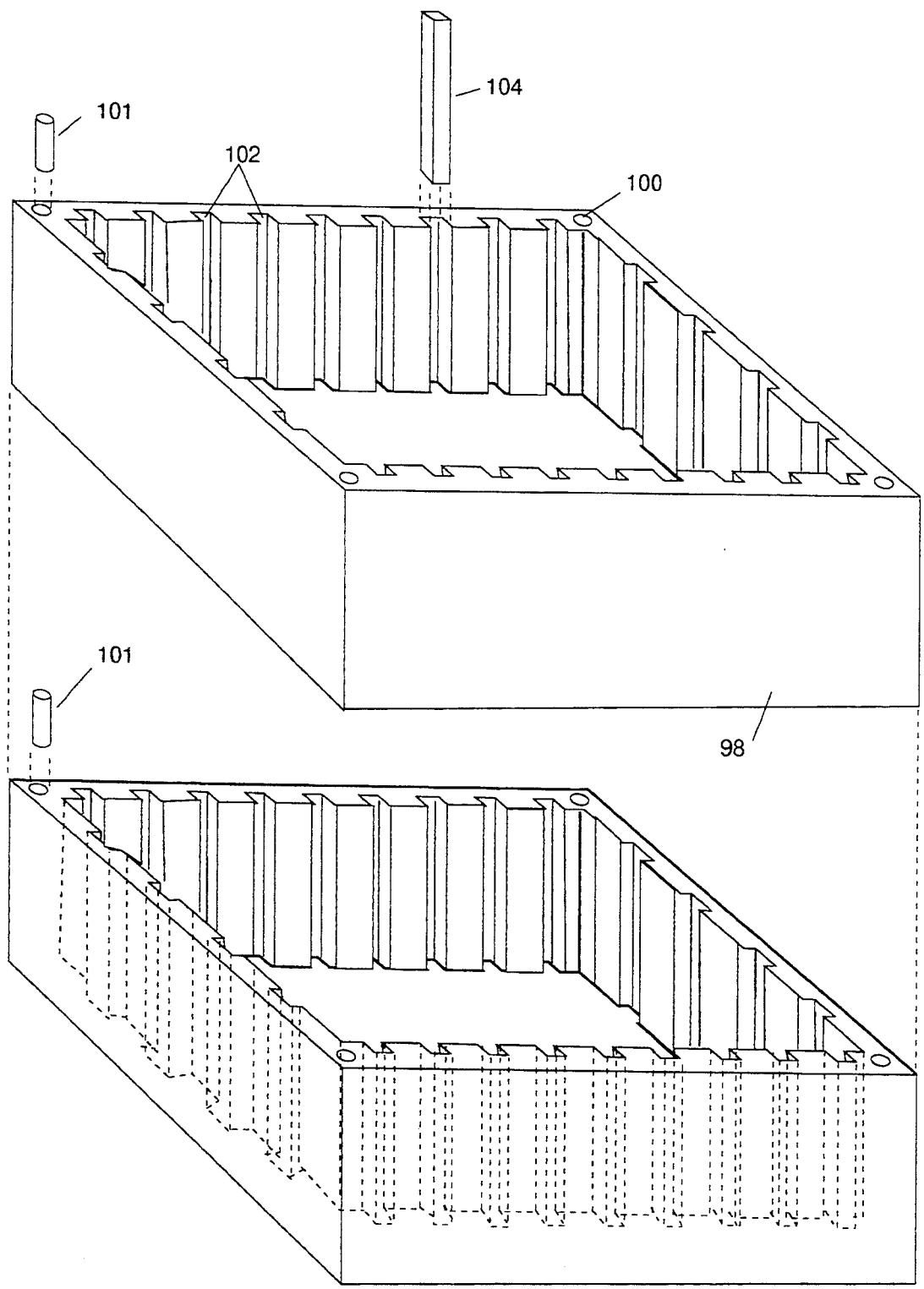
FIG. 12 is an exploded perspective view of two building floor assemblies.
Figure 13:
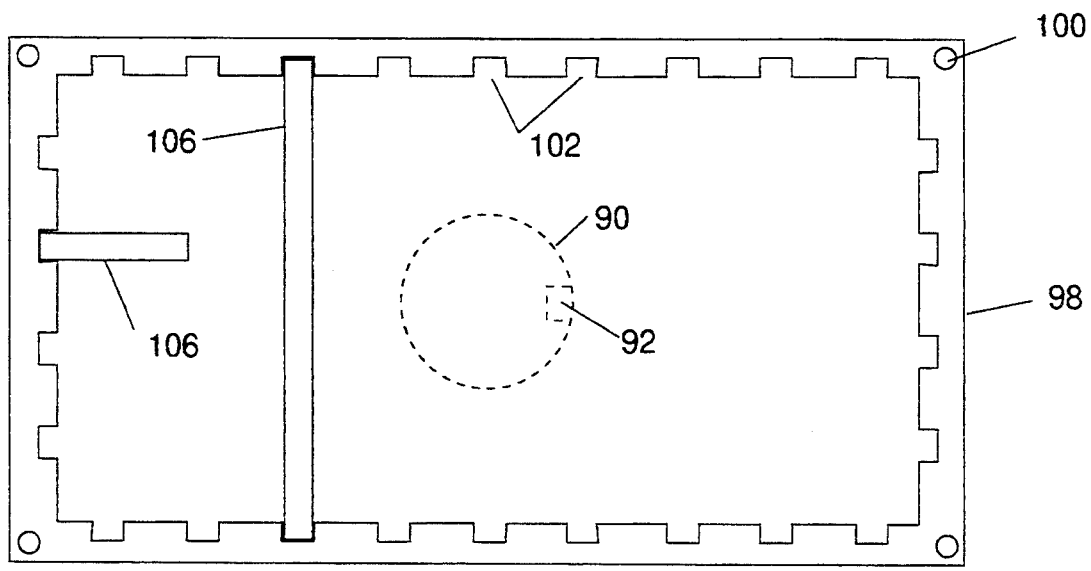
FIG. 13(a) shows a top view of a building floor assembly.
FIG. 13(b) shows a bottom view of a building floor assembly.
Figure 13:
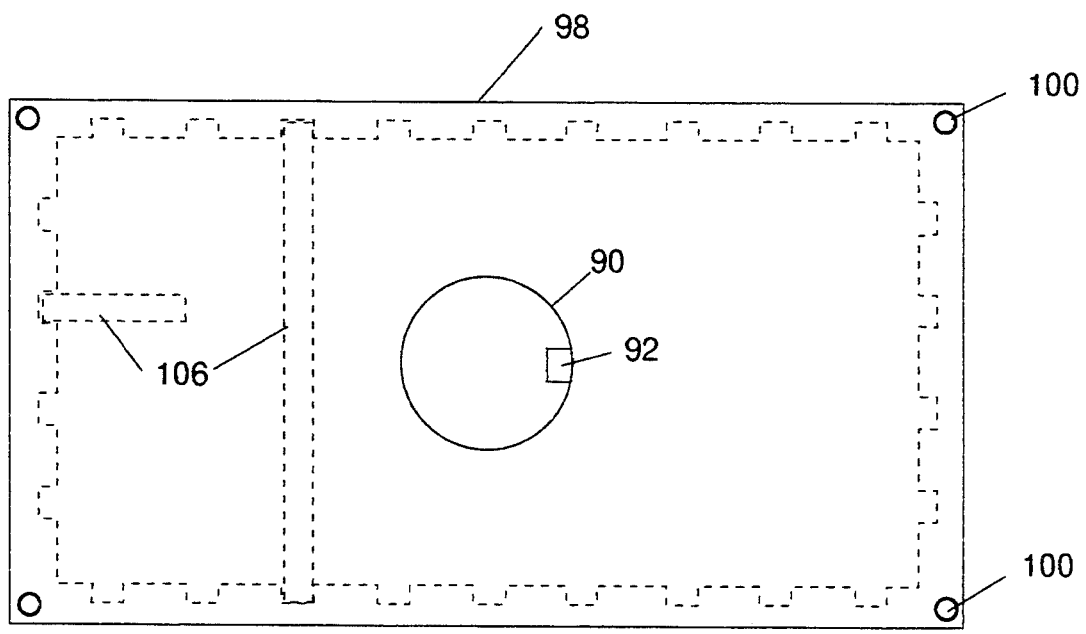
Figure 14:
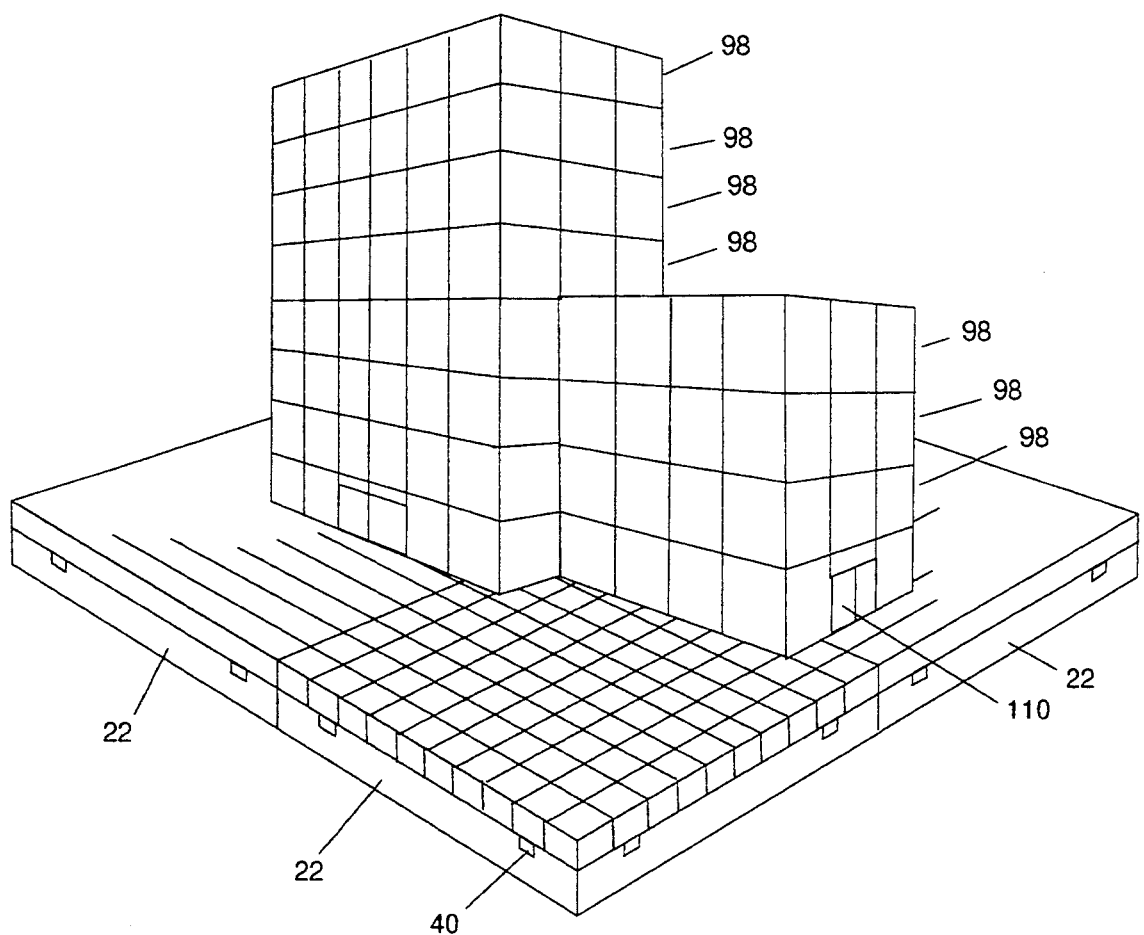
FIG. 14 is a perspective view of a large scale building mounted on a plurality of baseboards.

Referring now to FIG. 12, the larger buildings 36 can be broken down into sections to simulate activities inside the building 36. Each section, or building floor assembly 98, has a floor assembly connector hole 100 and an associated floor assembly connector pin 101 which allows the floor assemblies 98 to be stacked with no relative movement between them as shown in the exploded view of FIG. 12. The walls of the floor assembly 98 are provided with a plurality of rectangular wall panel slots 102 which are sized to provide frictional engagement with wall panels 106 as shown in FIG. 13(a) and (b). The wall panels 106 can come in different thicknesses and are arranged in accordance with the desired scheme. The wall panel slot fillers 104 are provided to fill the wall panel slots 102 so that the buildings 36 interior walls are substantially smooth. The position of the wall panels 106 can be recorded on a chart which is similar to the previously described chart. Each building is provided with a seperate chart. The broken lines in FIG. 13(a) show the outline of the registration pin socket 90 which are formed in the underside of the building floor assemblies 98 as shown in FIG. 13(b). FIG. 14 shows a very large scale building 36 which is mounted on a plurality of baseboards 22. Non-functional doors 110, elevator shafts, stairwells, and windows are represented by reusable decals. Buildings 36 are made of molded rubber, plastic, or other suitable lightweight materials.

An entire town or city can be represented by fabricating the town or city on a semi-rigid mat or base. The mat or base can have a registration pin socket 90 formed in the underside thereof and is mounted on the baseboard 22 in the same manner as the buildings 36. Smaller mats or bases will simply be placed on top of the terrain cell plugs 42. Arctic, jungle, forest and desert environments can all be simulated in a like manner. Ridges or mountains 30 are also attached to the baseboard 22 using the registration pin socket 90.

In the preferred embodiment small bodies of water such as rivers 33 and lakes 32 are represented by reusable static electric decals. Small bodies of water such as rivers 33 and lakes 32 can also be represented by blue colored rubber which is cut to the desired size and shape and placed at the appropriate location. Rivers 33 can alternatively be simulated using blue adhesive tape or can be molded into the top surface of the terrain cell plugs 42. Larger bodies of water can be secured to the baseboard 22 using the registration cell plugs 70. Roads 34 can be simulated using black or brown colored adhesive tape. Black tape can be used to represent main roads 34 and brown tape can be used to represent secondary roads 34. Roads 34 having several lanes are represented using relatively wider strips of tape than that which is used to represent single lane roads 34. The tape is easily placed and removed from the molded rubber terrain cell plugs 42 to allow for instant and repeated removal and relocation of the roads (or rivers). Alternatively the roads can be molded directly into the rubber as can rivers 33 and lakes 32. Depressions or valleys are cast directly into the terrain cell plugs 42. It can be readily appreciated that a pair of opposing "end" cell plugs 42 can be formed so that the length of the depression can be adjusted by simply placing the appropriate number of properly pre-routed or pre-grooved cell plugs 42 between the "end" cell plugs 42. Wadis or dry river beds are represented using cell plugs 42 which are of varying thickness to show the changing depth of the wadi.

In the preferred embodiment, the baseboard 22, terrain cell plugs 42, registration cell plugs 70, baseboard connector clips 28, and registration connector pins 72 are all made of EPDM rubber of the appropriate durometer. The following is suggested; 60-70 durometer for the baseboard 22, 60-70 durometer for buildings 36, 50-60 durometer for mountains 30, 50-60 durometer for the cell plugs 42, and 70-80 durometer for the baseboard connector clips 28 The baseboard connector clips 28 are additionally fortified by bonding EPDM rubber around a wire clip.

What is claimed ms:

1. A three dimensional model landscape apparatus, the apparatus being representative of an actual landscape including surface area and capable of supporting a plurality of structures, the apparatus comprising:
a baseboard assembly having a plurality of apertures;
a plurality of terrain cell units adapted for mounting within said apertures, each of said terrain cell units being representative of a section of surface area, said terrain cell units selectively having depressions formed therein;
fastening means for securing structures to said baseboard assembly, said fastening means adapted for mounting within the apertures.

2. The apparatus as defined in claim 1 wherein said terrain cell units are adapted for mounting within said apertures by providing a protruding portion extending from the underside thereof.

3. The apparatus as defined in claim 2 wherein the dimensions of said protruding portion correspond exactly with the dimensions of the apertures so as to provide frictional engagement therewith.

4. The apparatus as defined in claim 1 wherein said apertures are square.

5. The apparatus as defined in claim 1 wherein 100 of said apertures are formed in each of said baseboard assemblies, the apertures being arranged in a 10 by 10 matrix.

6. The apparatus as defined in claim 1 wherein said fastening means has a top surface and includes a central cylindrical bore, a pin adapted for rotatable mounting within said bore and having a part thereof projecting above the top surface of said fastening menas, said pin being appropriately sized for locking engagement with an irregularly shaped aperture provided in the underside of the structure.

7. The apparatus as defined in claim 6 wherein said pin allows for rotation to 16 discrete positions.

8. The apparatus as defined in claims 1, 2, 3, 4, 5, 6, or 7 including means for recording the position of said structures.

9. The apparatus as defined in claims 1, 6, or 7 where said structures can be disassembled to allow for inspection of the interior of the structures.

10. The apparatus of claim 9 where said structures can include buildings, the buildings having several floors, each floor capable of being arranged in accordance with a given floor plan.

11. The apparatus of claim 10 including means for recording the arrangement of each floor.

12. The apparatus of claims 1, 6, or 7 where said structures can be representative of naturally occuring terrain features or man made features.

* * * * *